United States Patent
Karlsson et al.

(10) Patent No.: US 7,000,141 B1
(45) Date of Patent: Feb. 14, 2006

(54) DATA PLACEMENT FOR FAULT TOLERANCE

(75) Inventors: Magnus Karlsson, Mountain View, CA (US); Qian Wang, State College, PA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 828 days.

(21) Appl. No.: 10/295,554

(22) Filed: Nov. 14, 2001

(51) Int. Cl.
*G06F 11/00* (2006.01)

(52) U.S. Cl. .......................................... 714/4; 709/201
(58) Field of Classification Search ................. 714/4, 714/3, 7, 13, 37, 33, 43; 709/201, 220, 221; 370/221, 222
See application file for complete search history.

(56) References Cited

U.S. PATENT DOCUMENTS

| | | | | |
|---|---|---|---|---|
| 5,485,571 A | * | 1/1996 | Menon ........................... | 714/7 |
| 5,664,093 A | * | 9/1997 | Barnett et al. ................. | 714/31 |
| 5,987,636 A | * | 11/1999 | Bommu et al. .............. | 714/738 |
| 6,000,040 A | * | 12/1999 | Culley et al. .................. | 714/31 |
| 6,067,651 A | * | 5/2000 | Rohrbaugh et al. .......... | 714/738 |
| 6,467,058 B1 | * | 10/2002 | Chakradhar et al. ........ | 714/745 |
| 6,560,720 B1 | * | 5/2003 | Chirashnya et al. .......... | 714/32 |
| 6,708,291 B1 | * | 3/2004 | Kidder .......................... | 714/39 |
| 6,715,097 B1 | * | 3/2004 | Kidder et al. .................. | 714/2 |
| 2002/0184587 A1 | * | 12/2002 | Boateng ...................... | 714/738 |
| 2003/0033132 A1 | * | 2/2003 | Algieri et al. ................. | 703/22 |
| 2003/0101382 A1 | * | 5/2003 | Gabele et al. ................ | 714/39 |
| 2004/0143811 A1 | * | 7/2004 | Kaelicke et al. ............ | 717/101 |

OTHER PUBLICATIONS

S. Mahmoud and J. Riordon. Optimal Allocation of Resources in Distributed Information Networks. In ACM Transactions on Database Systems, vol. 1, Issue 1, pp. 66-78, Mar. 1976.

R. Tew ari and N. Adam. Distributed File Allocation with Consistency Constraints. In Proceedings of the International Conference on Dsitributed Computing Systems, pp. 408-415, 1992.

L. Qiu, V. N. Padmanabham and G. M. Voelker. On the Placement of web server replicas. In Procedings of IEEE INFOCOM 2001, pp. 1587-1596, Apr. 2001.

J. Douceur and R. Wattenhofer. Optimizing File Availability in a Secure Serverless Distributed File System. In Proceedings of the International Confreneece on Distributed Computing Systems, pp. 4-13, Oct. 2001.

M. Karlsson, C. Karamanolis and M. Mahalingam. A Framework for Evaluating Replica Placement Algorithims. HP Labs Technical Reports, HPL-2002-219, Aug. 8, 2002.

* cited by examiner

*Primary Examiner*—Nadeem Iqbal
(74) *Attorney, Agent, or Firm*—Richard P. Lange

(57) ABSTRACT

A technique for data placement in a distributed system that takes into account fault tolerance. Data placement is performed in which data objects, and possibly replicas thereof, are assigned to nodes within the distributed system. The resulting placement is then tested to determine whether the system provides desired performance under various different fault scenarios. If not, the distributed system is altered such as by altering its capacity or its capacity allocations. Performing data placement, testing for fault-tolerance and altering capacity or capacity allocations are performed repetitively, thereby increasing the system's ability to provide the desired performance under the fault scenarios. Preferably, a system and placement are eventually determined that provide the desired performance under the given fault scenarios.

33 Claims, 4 Drawing Sheets

DATA PLACEMENT FOR FAULT TOLERANCE

BACKGROUND OF THE INVENTION

The present invention relates to the field of data placement in distributed computing systems. More particularly, the present invention relates to data placement for fault tolerance in distributed computing systems.

Many computing systems take the form of a distributed system in which processing capability and data storage capacity are distributed in a network. Typically, nodes of the network each include a processor and data storage. The data placed at any given node may be accessed locally, for use by the processor at the node, or remotely, for use by the processor of another node.

In such a distributed environment, consideration must be given to the placement and replication of data in the system. At one extreme, a single copy of a data object, such as a file, may be placed in the network. However, if many nodes need to access the data object, such an arrangement may result in unacceptably high levels of traffic directed to the node having the single copy of the data and may also result in unacceptably low reliability should a failure occur at that node. At another extreme, the data object may be replicated at every node. This arrangement, however, may result in an unacceptable level of traffic associated with updating the data at every node in order to maintain consistency whenever changes to the data occur and may also result in unacceptable cost of storage capacity needed to store all the data copies in the system.

For a distributed system, the ideal placement of data will depend upon a variety of factors, such as the number and sizes of data objects, the frequency in which objects are accessed or changed, the number and distance between nodes that require access to the same data, desired performance levels and desired tradeoffs between cost, performance and reliability. Due to the complexity of the problem, algorithms for data placement have been largely based on heuristics.

In addition, prior algorithms for determining a placement of data in a distributed system have typically ignored the issue of fault-tolerance. Accordingly, such systems are unlikely to meet performance requirements in the event of failures that inevitably occur in a distributed system. While some prior algorithms have taken fault-tolerance into account, these solutions also have disadvantages in that they tend to be computationally intractable for systems having more than a few nodes. Another disadvantage is that such solutions have been applicable only to a specific type of distributed system and load and, thus, lack general applicability.

Therefore, what is needed is a technique for data placement in a distributed system that has more general applicability than prior techniques and that takes into account fault-tolerance. It is to these ends that the present invention is directed.

SUMMARY OF THE INVENTION

The invention is a technique for data placement in a distributed system that takes into account fault tolerance. Data placement is performed in which data objects, and possibly replicas thereof, are assigned to nodes within the distributed system. The resulting placement is then analyzed to determine whether the system provides desired performance under various different fault scenarios. If not, the distributed system is altered such as by altering its capacity or its capacity allocations. Performing data placement, analyzing for fault-tolerance and altering capacity or capacity allocations are performed repetitively, thereby increasing the system's ability to provide the desired performance under the fault scenarios. Preferably, a system and placement are eventually determined that provide the desired performance under the given fault scenarios.

DETAILED DESCRIPTION OF A PREFERRED EMBODIMENT

The present invention is a technique that takes fault tolerance into account when placing data objects and replicas of data objects in a distributed computing system. In a distributed computing system, processing capability and data storage capacity are distributed in a network. Typically, nodes of the network each include a processor and data storage. Some nodes store data objects and, thus, function as storage servers. Other nodes access the data objects stored on the servers and, thus, function as clients of the servers. A node may function as both a storage server and as a client at the same time.

In accordance with the present invention, data objects are placed in a distributed system to satisfy desired performance levels, even under fault conditions. The distributed system may be modeled (e.g., analytical model or a simulation model), in which case, representations of data objects may be placed in a model of a distributed system. The data objects, and possibly replicas thereof, are placed by assigning each to a node within the distributed system (or model). A conventional data placement algorithm, including one that does not take fault-tolerance into account, may be used to initially place the data objects. The placement is then tested under various failure scenarios to determine whether the desired performance is achieved even under these failures. For example, where the conventional placement algorithm does not take into account the possibility of a server failure, such a failure may result in requests being redirected to another server. This redirection, however, may violate the desired performance level for the system (e.g., responses to the redirected requests may take too long due to server congestion or longer network distances). Where such a problem is encountered, the invention iteratively alters the infrastructure of the distributed system and places the objects based on the altered infrastructure in an attempt to provide the desired performance level despite the failure. As a result, the data objects are placed in such a way as to provide desired performance levels despite failures.

Figure 1:
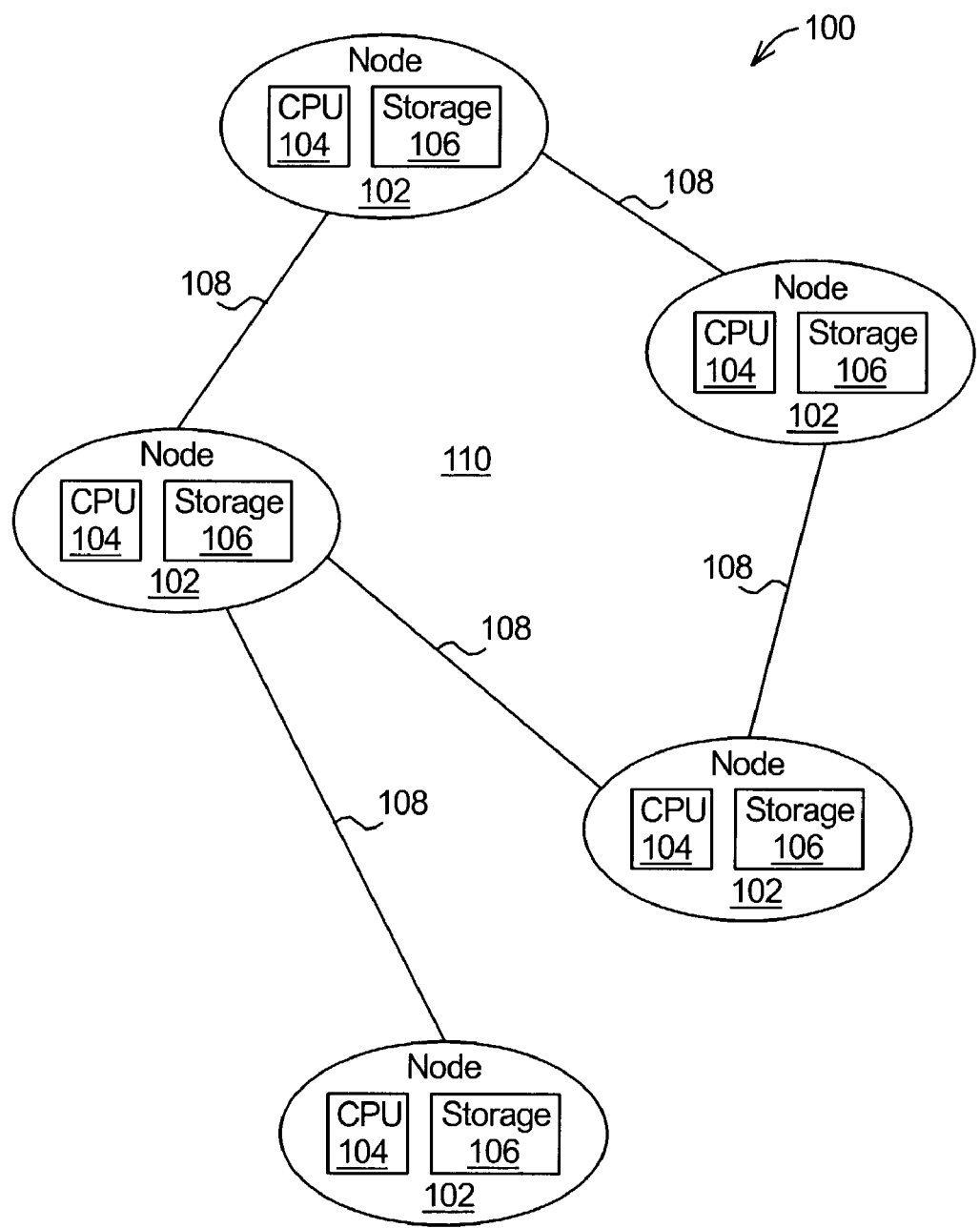
FIG. 1 illustrates an exemplary distributed computing system for which data placement may be performed in accordance with the present invention.

FIG. 1 illustrates an exemplary distributed computing system 100 for which data placement may be performed in accordance with the present invention. As shown in FIG. 1, each of several nodes 102 includes a processor 104 and data storage 106. The nodes 102 are interconnected by communication links 108 of a network 110. The distributed system 100 is exemplary in that the invention is applicable to any distributed system that allows flexibility in placement of data objects. Such systems include, but are not limited to, Storage Area Networks (SANs), Network Attached Storage (NAS) systems, storage bricks, global file systems, service allocation in and between data centers, content delivery networks, and so forth. Accordingly, the network 110 and the number and type of nodes 102 can differ from that illustrated in FIG. 1. For example, while the nodes 102 may be identical to each other, this will generally not be the case. Rather, a variety of different nodes, having different types of processors, different types and capacities of data storage, different types of network interfaces, etc., may be included in the same distributed system 100. Further, some nodes may function as storage servers only and may have limited processing capability to perform other tasks.

Figure 2:
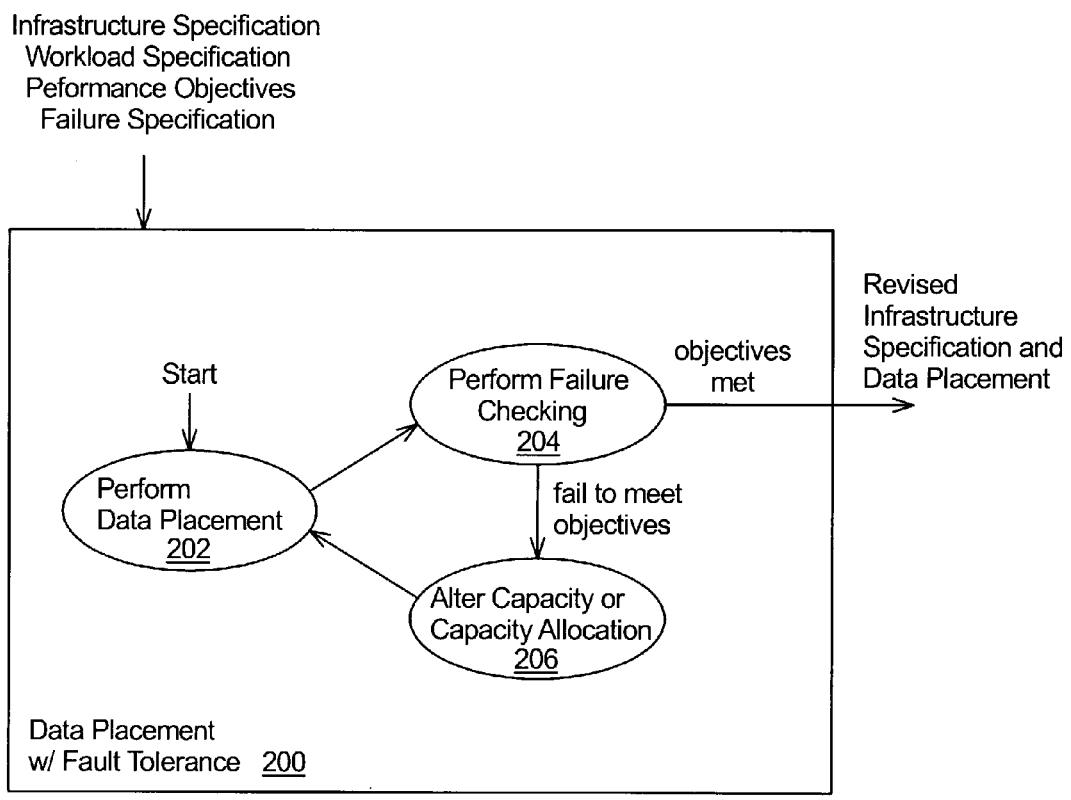
FIG. 2 illustrates diagrammatically a method for performing data placement in accordance with the present invention.

FIG. 2 illustrates diagrammatically a method 200 for performing data placement in accordance with the present invention. The method receives as input an initial infrastructure specification of the distributed system 100. The infrastructure specification specifies the number of nodes 102 in the system 100 and interconnections among the nodes. The infrastructure specification may include information for each node, for example, its data storage capacity, its processor capacity and its input/output (I/O) throughput and latency for data storage operations. In addition, the infrastructure specification may include information for each communication link 108 between nodes, such as communication bandwidth and latency.

In addition, the method 200 receives as input a workload specification for the distributed system 100. For example, the workload specification may include a trace (i.e. a listing) of activity records for the system 100 in which each activity record specifies an operation within the system 100 that generates storage or communication activity. For example, an activity record for a storage operation may identify an initiator of the operation (e.g., a particular application), a particular data object to which the operation is directed, the type of operation (e.g., read, write, refresh, etc.), and the location(s) within the data object of the data affected by the operation. As another example, an activity record for a communication operation may identify an initiator of the communication (e.g., a particular application), a recipient of the communication (e.g., another application or a data object) and the quantity of data communicated. The workload specification also specifies initial conditions for the distributed system 100, such as a number and size of data objects to be stored within the distributed system 100 and applications to be served by the system 100. The workload specification may be collected from the operation of a distributed system or may be artificially generated using conventional techniques for generation of a synthetic workload.

Performance objectives may also be received as input to the method 200. The performance objectives specify desired levels of performance to be achieved by the distributed system 100 as it operates under the workload. For example, a particular performance objective may specify a maximum latency allowable for certain operations within the system 100. For example, a maximum latency may be specified for data retrieval requests where the retrieval time is the time required to deliver data to a requesting application measured from the time the request is issued by the application. Another performance objective may specify that less than a predetermined percentage of requests (e.g., 10%) exceed a specified latency. Yet another performance objective may specify a throughput objective, such as a maximum queue length for sequential operations that are waiting to occur after prior operations in the sequence are completed.

Further, one or more of the performance objectives, and possibly all of the performance objectives, are specified to be met despite the occurrence of certain faults within the system 100, such as inoperable communication links or storage devices. Thus, a failure specification may be provided as input to the method 200. The failure specification indicates the failures that the system 100 is intended to be able to withstand while still maintaining the performance objectives. For example, the failure specification may specify that the system 100 is to withstand a complete failure of any single network element, such as a node or communication link. As another example, the failure specification may specify that the system 100 is to withstand the simultaneous failure of any two (or more) nodes or communication links (or combination thereof).

An initial data placement is performed in step 202, based on input to the method 200, such as the infrastructure specification and the number of type of data objects to be placed in the distributed system. The initial data placement includes the data objects, and possibly replicas of the data objects, assigned to various locations within the system 100. For example, a data object may be assigned to a node or to a storage device of a node, depending on the specificity of the infrastructure specification and placement algorithm. A conventional data placement algorithm may be used in step 202 that does not take into account fault tolerance objectives.

One exemplary algorithm that may be used in step 202 may be referred to as a "greedy ranking algorithm." Using this algorithm, all possible combinations of placing one copy of a data object at one node in the system are ranked. The ranking is in accordance with criterion that is expected to affect the performance of the system 100, such as a number of local read operations required for a particular placement. The data object with the highest rank is then placed in the system 100. A new ranking is then computed for the remaining data objects and the one having the highest rank is placed. This process is repeated until some predefined objective has been met. This could be, for example, that all of the objects have been placed or the desired performance requirements are satisfied. Another exemplary algorithm that may be used in step 202 may be referred to as a "swap algorithm." Using this algorithm, an initial placement is generated, for example, by a random placement. Then, positions of pairs or groups of data objects are exchanged (i.e. swapped) until a placement is achieved that satisfies desired performance requirements. While the greedy ranking algorithm or the swap algorithm may be used in step 202, it will be apparent that another placement algorithm may be used.

In step 204, one or more failure scenarios are applied to the system 100 and a determination is made as to whether or not the specified performance objectives are met under each failure scenario. If the specified performance objectives are not met under an applied failure scenario, then program flow moves to a step 206 in which the initial infrastructure specification is altered. This may be accomplished by altering capacity and/or capacity allocation of a resource in the infrastructure specification.

Capacity may be altered, for example, by increasing or decreasing the number of nodes in the system, increasing or decreasing the storage capacity at one or more nodes (e.g., by altering the number or size of storage devices, such as hard disks), by increasing or decreasing the number of communication links among nodes, or by increasing or decreasing the bandwidth capacity of one or more of the communication links.

Capacity, such as storage capacity of a node or bandwidth capacity of a communication link may be allocated to certain uses. For example, storage capacity may be allocated to a particular data object or application. Similarly, bandwidth capacity of communication links may be allocated to particular application programs. These allocations of storage capacity and communication bandwidth tend to inhibit applications from interfering with each other. For example, the allocation for storage space on a node may be in excess of the actual size of the objects stored there so as to allow an application's storage demands to grow over time. These allocations may be provided, for example, as input to the method 200 or may be developed during the data placement step 202. Thus, altering capacity allocated to a use tends to alter the capacity available for other uses. Accordingly, rather than, or in addition to, altering capacity, capacity allocation may be altered in step 206.

Capacity allocations may be altered, for example, by altering a maximum allowed bandwidth utilization of a communication link between a pair of nodes of the distributed system 100 or by altering a maximum allowed storage capacity utilization of a node of the distributed system 100.

Increasing capacity will tend to increase the cost of the distributed system because additional hardware (e.g., storage devices) will generally be required to provide the additional capacity. However, increasing capacity allocation, which generally does not require additional hardware, is generally expected to have a lower associated cost. Accordingly, alterations to capacity allocation may be attempted before alterations to capacity, so as to minimize cost.

In general, it is expected that increases in capacity or capacity allocation are more likely to improve the fault tolerance of the distributed system than decreases. However, in certain circumstances it may be desired to also decrease capacity or capacity allocation, particularly where a decrease is accompanied by an offsetting increase in capacity or capacity allocation.

In one aspect, where the system 100 fails to meet a performance objective in step 204, a node or a communication link is added to the system 100 in step 206 before returning to the data placement step 202. Determining whether to add a node or a communication link may be based on which is in shortest supply. Thus, for example, if a performance objective that is not met is for communication latency between nodes, then an additional communication link may be added to the system 100. However, if a performance objective that is not met is for throughput of storage operations, then an additional node may be added to the system 100.

After altering the infrastructure in step 206, placement is performed in step 202 based on the newly-changed infrastructure. The same placement algorithm may be performed in each pass through the step 202. Thus, in step 202 all of the data objects may be reassigned to the newly-changed infrastructure. Alternately, for certain passes through the step 202, a simplified placement algorithm may be performed. For example, a portion the data objects may re-assigned to the newly-changed infrastructure during a pass through step 202, rather than re-assigning all of the objects during each pass.

Figure 3:
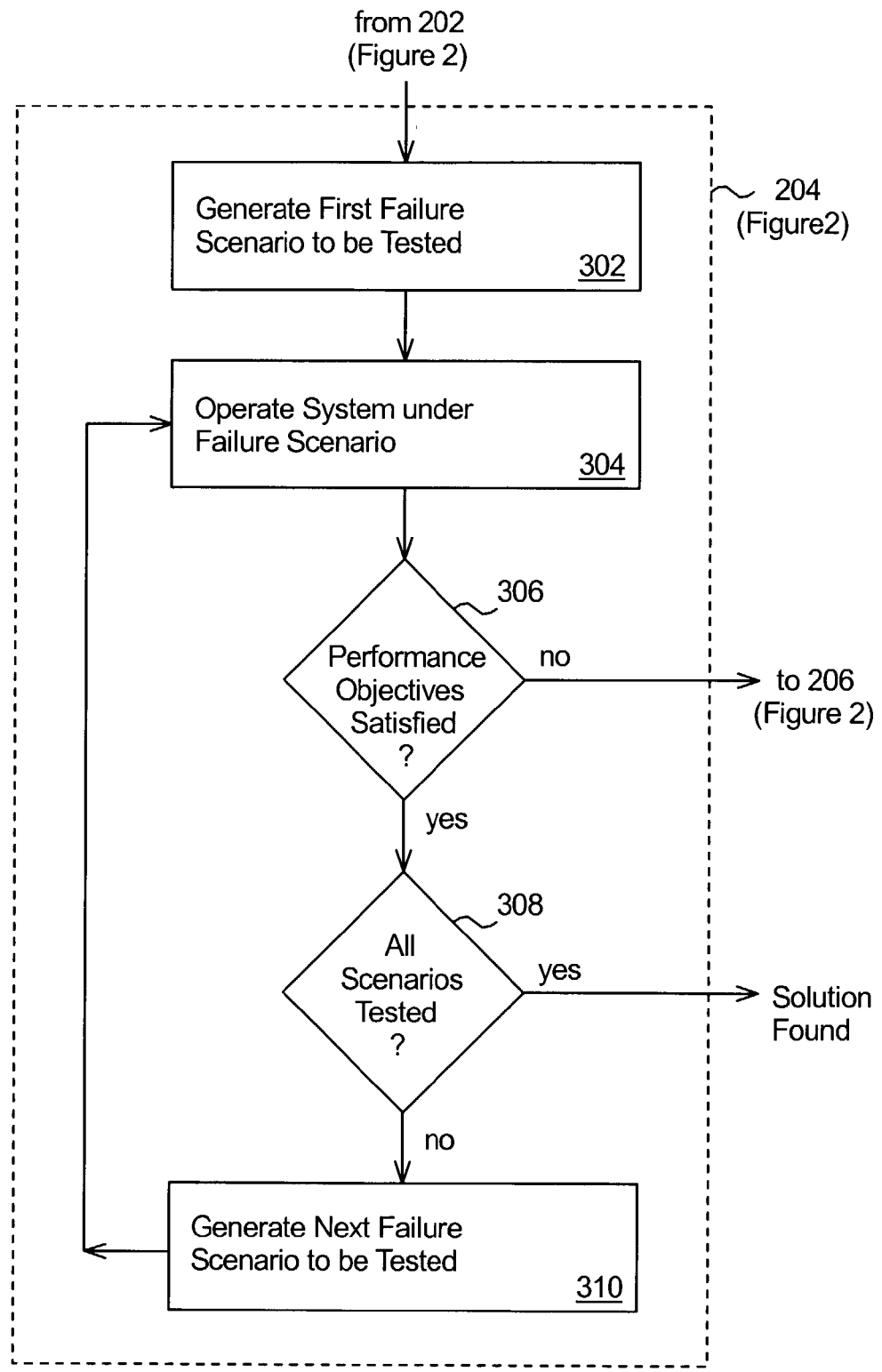
FIG. 3 illustrates diagrammatically a method for performing failure checking in accordance with an aspect of the present invention.

FIG. 3 illustrates a flow diagram 204 for performing failure checking in accordance with an aspect of the present invention. FIG. 3 illustrates step 204 of FIG. 2 in more detail. From step 202 (FIG. 2), program flow begins in step 302 in which a first failure scenario to be tested is generated. Thus, a failure scenario, such as a link that is down or an inoperable node, is applied to the distributed system 100. This may be accomplished by disabling a portion of the system 100 so as to simulate a failure of the disabled portion.

In step 304, the system 100 is operated under the failure conditions applied in step 304 to determine whether the system 100 meets the desired performance objectives under the failure conditions. This may include operating a real distributed system or a computer-implemented model thereof. Thus, in step 304 the workload specification may be applied to the system 100 while portions of the system 100 are disabled. During operation, system performance is monitored, such as by measuring latencies of various operations or queue lengths for operations that are scheduled to occur.

In step 306, a determination is made as to whether the performance objectives are satisfied under the current failure scenario. When the performance objectives are satisfied, program flow moves to a step 308 in which a determination is made as to whether all desired failure scenarios have been tested. For example, a set of failure scenarios may encompass all possible single failures of a node or communication link. Thus, each failure scenario may specify one link or node that is to be disabled for testing the system 100. In other examples, it may be desired to determine whether the system 100 is able to withstand multiple simultaneous failures. In this case, a set of failure scenarios may specify various combinations of two or more links or nodes that are to be simultaneously disabled or all possible combinations of such failures.

When all the failure scenarios have not yet been tested, program flow moves to a step 310. In step 310, a next failure scenario is generated. In this step, a portion of the distributed system 100 may be disabled that is different from the portion disabled in step 302.

In this way, each desired failure scenario may be tested sequentially. The sequence may be random, or predetermined, e.g., by the failure specification. Alternately, the sequence may be changed depending upon prior results. For example, previously failed scenarios may be tested prior to untested scenarios or previously passed scenarios. As another example, failure scenarios may be ordered according which is most likely to result in failure to meet a performance objective. Thus, scenarios in which one or more heavily-loaded elements, such as nodes and/or communication links, are disabled may be tested before scenarios in which lightly-loaded elements are disabled. As another example, once a failure scenario is passed by the design, it may be omitted from all subsequent testing.

From step 310, program flow returns to step 304 in which the distributed system (real or modeled) is operated again under the workload, however, for this pass through step 304 new failure conditions are applied to the system 100.

This process of generating failure scenarios and testing the system 100 to determine whether the performance objectives are met may be repeated until it is determined that a performance objective is not met for a failure scenario or until it is determined that all of the scenarios have been successfully tested.

When it is determined that a performance objective is not satisfied (in step 306), program flow may return to step 206 of FIG. 2 in which the infrastructure specification is altered in an attempt to provide an ability to withstand the particular failure which caused the performance objectives to not be met. Once the infrastructure specification has been altered in step 206 (FIG. 2) and a new placement made in step 202 (FIG. 2), program flow may return to step 302.

In a next pass through the method of FIG. 3, all of the same failure scenarios may be repeated so as to ensure that the altered system 100 still satisfies the performance objectives under all of the failure scenarios. For example, where a capacity or a capacity allocation is reduced in step 206, this may result in a failure scenario under which the performance objectives were previously determined to be met to no longer be met. Thus, it may be desired to re-test all failure scenarios.

Alternately, in the next pass through the method of FIG. 3, only scenarios that previously caused the performance objectives to not be met (i.e. the failed scenarios) may be performed so as to avoid repeating tests that have already been passed. For example, where capacity or capacity allocations are increased only, it is expected to be unlikely that a failure scenario that resulted in performance objectives being met (i.e. a passed scenario) will now result in a performance objective not being met.

When it is determined in step 308, that all of the performance objectives are satisfied under each of the failure scenarios, this indicates that a data placement solution has been found. In this case, program flow may terminate with this solution. The method 100 may be repeated (using the same or different placement algorithms), so that a design solution can be selected from among multiple alternative solutions. For example, a lowest-cost solution may be selected from the alternatives.

Thus, a technique has been described in which fault tolerance is taken into account for data placement. The invention achieves significant advantages in that can be performed efficiently in that it can be performed programmatically by use of a computer system. In addition, the invention is applicable to wide variety of distributed systems.

Figure 4:
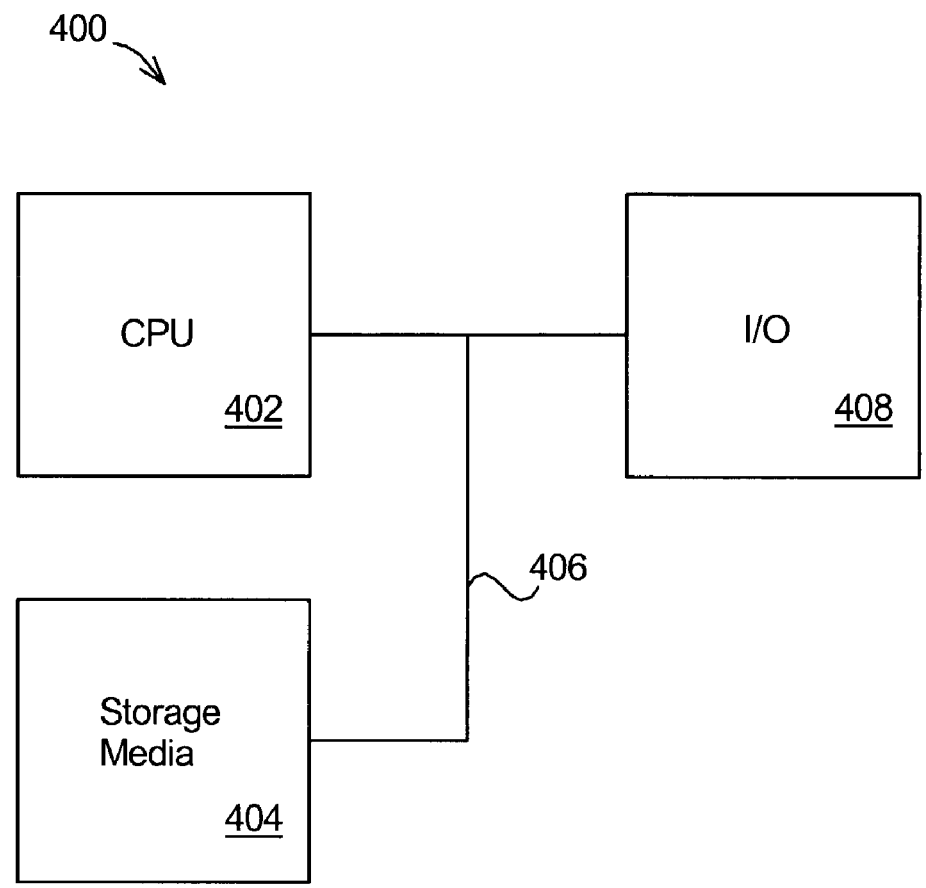
FIG. 4 illustrates a general purpose computer system by which the present invention may be implemented.

FIG. 4 illustrates a block schematic diagram of general-purpose computer system by which the present invention, including portions of the methods of FIGS. 2 and 3, may be implemented. The computer system 400 may include a general-purpose processor 402, a storage media 404, such as persistent memory (e.g., a hard disk for program memory) and transitory memory (e.g., RAM), a communication bus 406, and input/output devices 408, such as a keyboard, monitor, mouse, printer and network interface. The computer system 400 is conventional. As such, it will be apparent that the system 400 may include more or fewer elements than shown in FIG. 4 and that other elements may be substituted for those illustrated in FIG. 4.

Thus, the inputs to the method 200, such as the infrastructure specification, workload specification and performance guarantees may be input to the computer system 400 in the form of computer-readable data files that may be stored in computer-readable media 404. In addition, the computer system 400 may implement the methods of FIGS. 2 and 3 by the CPU 402 executing a programmed sequence of instructions stored in the computer-readable media 404.

As mentioned, the method 200 may be performed on a real distributed system, as is illustrated in FIG. 1. Alternately, the method 200 may be performed on a model of the distributed system, such as an analytical model or a simulation model. Where the distributed system 100 is modeled, the model may be implemented, for example, by the computer system 400. A real system may then be constructed based on results using the model. The methods of FIGS. 2 and 3 may then be applied to the real system so constructed.

In this way, the results based on the model can be verified and refined, as necessary, using the methods of FIGS. 2 and 3.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of placing data in a distributed system taking into account fault-tolerance, including assigning data objects to nodes in a distributed computing system, thereby forming a resulting design and testing the design having the resulting placement to determine whether desired performance is achieved under a plurality of applied fault scenarios and when the desired performance cannot be achieved under each of the plurality of applied fault scenarios altering the design by altering a capacity or a capacity allocation for the design and re-assigning the data objects to the nodes based on the altered design.

2. The method according to claim 1, further including testing the altered design under one or more of the fault scenarios.

3. The method according to claim 2, wherein said testing and said re-assigning are repeatedly performed until the desired performance is achieved under each of the plurality of fault scenarios.

4. The method according to claim 2, wherein the fault scenarios are ordered randomly for said testing the altered design.

5. The method according to claim 2, wherein the fault scenarios are ordered in a predetermined order for said testing the altered design.

6. The method according to claim 2, wherein the fault scenarios are ordered for testing the altered design based on prior results of testing.

7. The method according to claim 6, wherein the fault scenarios are ordered for testing the altered design according the load of nodes in the distributed system.

8. The method according to claim 6, wherein the fault scenarios are ordered for testing the altered design according to whether a fault scenario was previously tested.

9. The method according to claim 6, wherein fault scenarios that previously resulted in the desired performance not being met are performed before fault scenarios for which desired performance was previously met.

10. The method according to claim 6, wherein each fault scenario for which desired performance was previously met is omitted from all subsequent testing.

11. The method according to claim 1, wherein said re-assigning includes re-assigning all of the data objects to the altered design.

12. The method according to claim 1, wherein said re-assigning includes re-assigning a portion of the data objects to the altered design.

13. The method according to claim 1, wherein said design is altered by altering a capacity allocation prior to altering a capacity of the design.

14. The method according to claim 1, wherein altering a capacity allocation of the design includes altering a maximum bandwidth utilization of a communication link between a pair of nodes of the distributed system.

15. The method according to claim 1, wherein altering a capacity allocation of the design includes altering a maximum storage capacity utilization of a node of the distributed system.

16. The method according to claim 1, wherein altering a capacity of the design includes increasing a communication bandwidth between a pair of nodes of the distributed system.

17. The method according to claim 1, wherein altering a capacity of the design includes increasing a storage capacity of a node of the distributed system.

18. The method according to claim 1, wherein altering a capacity of the design includes adding a link to the distributed storage system.

19. The method according to claim 1, wherein altering a capacity of the design includes adding a node to the distributed system.

20. The method according to claim 1, wherein altering a capacity of the design includes determining whether to add a link or a node to the distributed system based on which is in shortest supply.

21. The method according to claim 1, wherein altering capacity of the design includes increasing a capacity or capacity allocation and decreasing a different capacity or capacity allocation.

22. The method according to claim 1, wherein altering capacity of the design includes decreasing a capacity or capacity allocation.

23. The method according to claim 1, wherein said step of re-assigning the data objects to the nodes is performed in accordance with a greedy ranking algorithm.

24. The method according to claim 1, wherein said step of re-assigning the data objects to the nodes is performed in accordance with a data object swapping algorithm.

25. The method according to claim 1, wherein the distributed system is a real system for performing said testing.

26. The method according to claim 1, wherein the distributed system is modeled for performing said testing.

27. The method according to claim 26, wherein a model of the distributed system includes a simulation model.

28. The method according to claim 26, wherein a model of the distributed system includes an analytical model.

29. The method according to claim 1, wherein the fault scenarios each correspond to a failure of a single link or node of the distributed system.

30. The method according to claim 1, wherein the fault scenarios each correspond to a simultaneous failure of a group of two or more elements of the distributed system wherein the group consists of links, nodes or both.

31. The method according to claim 1 being computer-implemented.

32. A program storage device readable by a machine, tangibly embodying a program of instructions executable by the machine to perform method steps for placing data in a distributed system taking into account fault-tolerance, said method steps including assigning data objects to nodes in a distributed computing system, thereby forming a resulting design and testing the design having the resulting placement to determine whether desired performance is achieved under a plurality of applied fault scenarios and when the desired performance cannot be achieved under each of the plurality of applied fault scenarios altering the design by altering a capacity or a capacity allocation for the design and re-assigning the data objects to the nodes based on the altered design.

33. The method according to claim 30, wherein the distributed system is modeled by the machine for performing said testing.

* * * * *